(12) United States Patent
Sheridan et al.

(10) Patent No.: US 8,756,908 B2
(45) Date of Patent: *Jun. 24, 2014

(54) FUNDAMENTAL GEAR SYSTEM ARCHITECTURE

(71) Applicant: United Technologies Corporation, Hartford, CT (US)

(72) Inventors: William G. Sheridan, Southington, CT (US); Michael E. McCune, Colchester, CT (US); Frederick M. Schwarz, Glastonbury, CT (US); Daniel Bernard Kupratis, Wallingford, CT (US); Gabriel L. Suciu, Glastonbury, CT (US); William K. Ackermann, East Hartford, CT (US); Jason Husband, South Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/034,720

(22) Filed: Sep. 24, 2013

(65) Prior Publication Data

US 2014/0020404 A1 Jan. 23, 2014

Related U.S. Application Data

(63) Continuation-in-part of application No. 13/557,614, filed on Jul. 25, 2012, now Pat. No. 8,572,943.

(60) Provisional application No. 61/653,731, filed on May 31, 2012.

(51) Int. Cl.
*F02C 7/06* (2006.01)

(52) U.S. Cl.
USPC .......................................................... 60/39.08

(58) Field of Classification Search
USPC .............................. 60/39.08, 805; 184/104.1; 415/111–113, 124.1, 124.2, 175
See application file for complete search history.

(56) References Cited

U.S. PATENT DOCUMENTS

| 2,608,821 A | 9/1952 | Hunsaker |
| 2,748,623 A | 6/1956 | Hill |

(Continued)

FOREIGN PATENT DOCUMENTS

| GB | 1309721 | 3/1973 |
| GB | 2130340 | 5/1984 |
| GB | 2199375 | 7/1988 |
| GB | 2419639 | 9/2009 |

OTHER PUBLICATIONS

Diagram of prior art V2500 and PW4090 engines.
Jane's Aero-Engines, Issue Seven, Copyright 2000, pp. 510-512.

(Continued)

*Primary Examiner* — Phutthiwat Wongwian
(74) *Attorney, Agent, or Firm* — Carlson, Gaskey & Olds, P.C.

(57) ABSTRACT

A fan drive gear system for a gas turbine engine includes a gear system that provides a speed reduction between a fan drive turbine and a fan and a mount flexibly supporting portions of the gear system. A lubrication system supporting the fan drive gear system provides lubricant to the gear system and removes thermal energy produced by the gear system. The lubrication system includes a capacity for removing energy equal to less than about 2% of energy input into the gear system.

20 Claims, 4 Drawing Sheets

(56) References Cited

U.S. PATENT DOCUMENTS

| | | |
|---|---|---|
| 2,826,255 A | 3/1958 | Peterson |
| 3,033,002 A | 5/1962 | Allan |
| 3,111,005 A | 11/1963 | Howell et al. |
| 3,185,857 A | 5/1965 | Johnson |
| 3,363,419 A | 1/1968 | Wilde |
| 3,526,092 A | 9/1970 | Steel |
| 3,729,957 A | 5/1973 | Petrie et al. |
| 3,747,343 A | 7/1973 | Rosen |
| 3,754,484 A | 8/1973 | Roberts |
| 3,861,139 A | 1/1975 | Jones et al. |
| 4,020,632 A | 5/1977 | Coffinberry et al. |
| 4,118,927 A | 10/1978 | Kronogard |
| 4,136,286 A | 1/1979 | O'Halloran |
| 4,233,555 A | 11/1980 | Roche |
| 4,405,892 A | 9/1983 | Staerzl et al. |
| 4,452,567 A | 6/1984 | Treby et al. |
| 4,463,553 A | 8/1984 | Boudigues |
| 4,660,376 A | 4/1987 | Johnson |
| 4,808,076 A | 2/1989 | Jarmon et al. |
| 4,809,498 A | 3/1989 | Giffin et al. |
| 4,827,712 A | 5/1989 | Coplin |
| 4,879,624 A | 11/1989 | Jones et al. |
| 5,074,109 A | 12/1991 | Mandet et al. |
| 5,081,832 A | 1/1992 | Mowill |
| 5,107,676 A | 4/1992 | Hadaway et al. |
| 5,160,251 A | 11/1992 | Ciokajlo |
| 5,168,208 A | 12/1992 | Schultz et al. |
| 5,182,464 A | 1/1993 | Woodworth et al. |
| 5,252,905 A | 10/1993 | Wills |
| 5,307,622 A | 5/1994 | Ciokajlo et al. |
| 5,388,964 A | 2/1995 | Ciokajlo et al. |
| 5,390,068 A | 2/1995 | Schultz |
| 5,433,674 A | 7/1995 | Sheridan et al. |
| 5,625,276 A | 4/1997 | Scott et al. |
| 5,694,027 A | 12/1997 | Satake et al. |
| 5,694,765 A | 12/1997 | Hield et al. |
| 5,729,059 A | 3/1998 | Kilroy et al. |
| 5,734,255 A | 3/1998 | Thompson et al. |
| 5,740,668 A | 4/1998 | Fujiwara et al. |
| 5,754,033 A | 5/1998 | Thomson et al. |
| 5,791,789 A | 8/1998 | Van Duyn et al. |
| 5,806,303 A | 9/1998 | Johnson et al. |
| 5,886,890 A | 3/1999 | Ishida et al. |
| 5,949,153 A | 9/1999 | Tison et al. |
| 6,073,439 A | 6/2000 | Beaven et al. |
| 6,104,171 A | 8/2000 | Dvorsky et al. |
| 6,209,311 B1 | 4/2001 | Itoh et al. |
| 6,223,616 B1 | 5/2001 | Sheridan |
| 6,260,351 B1 | 7/2001 | Delano et al. |
| 6,339,927 B1 | 1/2002 | DiPirtro, Jr. |
| 6,378,308 B1 | 4/2002 | Pfluger |
| 6,555,929 B1 | 4/2003 | Eaton et al. |
| 6,619,030 B1 | 9/2003 | Seda et al. |
| 6,631,310 B1 | 10/2003 | Leslie |
| 6,639,331 B2 | 10/2003 | Schultz |
| 6,647,707 B2 | 11/2003 | Dev |
| 6,653,821 B2 | 11/2003 | Kern et al. |
| 6,657,416 B2 | 12/2003 | Kern et al. |
| 6,663,530 B2 | 12/2003 | Poulin et al. |
| 6,668,629 B1 | 12/2003 | Leslie |
| 6,669,393 B2 | 12/2003 | Schilling |
| 6,708,482 B2 | 3/2004 | Seda |
| 6,732,502 B2 | 5/2004 | Seda et al. |
| 6,735,954 B2 | 5/2004 | MacFarlane et al. |
| 6,763,653 B2 | 7/2004 | Orlando et al. |
| 6,792,759 B2 | 9/2004 | Rollins, III |
| 6,847,297 B2 | 1/2005 | Lavoie et al. |
| 6,855,089 B2 | 2/2005 | Poulin et al. |
| 6,892,115 B2 | 5/2005 | Berkcan et al. |
| 6,895,741 B2 | 5/2005 | Rago et al. |
| 6,909,942 B2 | 6/2005 | Andarawis et al. |
| 6,914,763 B2 | 7/2005 | Reedy |
| 6,966,174 B2 | 11/2005 | Paul |
| 6,985,784 B2 | 1/2006 | Vandevanter et al. |
| 6,999,291 B2 | 2/2006 | Andarawis et al. |
| 7,019,495 B2 | 3/2006 | Patterson |
| 7,043,340 B2 | 5/2006 | Papallo et al. |
| 7,055,306 B2 | 6/2006 | Jones et al. |
| 7,104,918 B2 | 9/2006 | Mitrovic |
| 7,144,349 B2 | 12/2006 | Mitrovic |
| 7,195,446 B2 | 3/2007 | Seda et al. |
| 7,216,475 B2 | 5/2007 | Johnson |
| 7,219,490 B2 | 5/2007 | Dev |
| 7,223,197 B2 | 5/2007 | Poulin et al. |
| 7,269,938 B2 | 9/2007 | Moniz et al. |
| 7,299,621 B2 | 11/2007 | Bart et al. |
| 7,301,738 B2 | 11/2007 | Pearlman et al. |
| 7,334,392 B2 | 2/2008 | Moniz et al. |
| 7,338,259 B2 | 3/2008 | Shah et al. |
| 7,406,830 B2 | 8/2008 | Valentian et al. |
| 7,409,819 B2 | 8/2008 | Henry |
| 7,500,365 B2 | 3/2009 | Suciu et al. |
| 7,513,103 B2 | 4/2009 | Orlando et al. |
| 7,557,544 B2 | 7/2009 | Heinz et al. |
| 7,591,754 B2 | 9/2009 | Duong et al. |
| 7,594,404 B2 | 9/2009 | Somanath et al. |
| 7,600,370 B2 | 10/2009 | Dawson |
| 7,610,763 B2 | 11/2009 | Somanath et al. |
| 7,632,064 B2 | 12/2009 | Somanath et al. |
| 7,656,060 B2 | 2/2010 | Algrain |
| 7,665,293 B2 | 2/2010 | Wilson et al. |
| 7,685,808 B2 | 3/2010 | Orlando et al. |
| 7,694,505 B2 | 4/2010 | Schilling |
| 7,704,178 B2 | 4/2010 | Sheridan et al. |
| 7,716,914 B2 | 5/2010 | Schilling |
| 7,721,549 B2 | 5/2010 | Baran |
| 7,762,086 B2 | 7/2010 | Schwark |
| 7,765,786 B2 | 8/2010 | Klingels et al. |
| 7,797,946 B2 | 9/2010 | Kumar et al. |
| 7,815,417 B2 | 10/2010 | Somanath et al. |
| 7,816,813 B2 | 10/2010 | Yagudayev et al. |
| 7,832,193 B2 | 11/2010 | Orlando et al. |
| 7,841,163 B2 | 11/2010 | Welch et al. |
| 7,841,165 B2 | 11/2010 | Orlando et al. |
| 7,871,247 B2 | 1/2011 | Shah et al. |
| 7,882,691 B2 | 2/2011 | Lemmers, Jr. et al. |
| 7,882,693 B2 | 2/2011 | Schilling |
| 7,926,260 B2 | 4/2011 | Sheridan et al. |
| 7,942,079 B2 | 5/2011 | Russ |
| 7,950,237 B2 | 5/2011 | Grabowski et al. |
| 7,959,532 B2 | 6/2011 | Suciu et al. |
| 8,015,798 B2 | 9/2011 | Norris et al. |
| 8,015,828 B2 | 9/2011 | Moniz et al. |
| 8,061,969 B2 | 11/2011 | Durocher et al. |
| 8,075,261 B2 | 12/2011 | Merry et al. |
| 8,091,371 B2 | 1/2012 | Durocher et al. |
| 8,104,265 B2 | 1/2012 | Kupratis |
| 8,104,289 B2 | 1/2012 | McCune et al. |
| 8,106,633 B2 | 1/2012 | Dozier et al. |
| 8,166,748 B2 | 5/2012 | Schilling |
| 8,172,717 B2 | 5/2012 | Lopez et al. |
| 8,191,352 B2 | 6/2012 | Schilling |
| 8,220,245 B1 | 7/2012 | Papandreas |
| 8,297,916 B1 | 10/2012 | McCune et al. |
| 8,297,917 B1 | 10/2012 | McCune et al. |
| 8,366,385 B2 * | 2/2013 | Davis et al. ............... 415/124.2 |
| 2003/0235523 A1 | 12/2003 | Lyubovsky et al. |
| 2005/0138914 A1 | 6/2005 | Paul |
| 2005/0257528 A1 | 11/2005 | Dunbar, Jr. |
| 2006/0029894 A1 | 2/2006 | Zinn et al. |
| 2006/0130456 A1 | 6/2006 | Suciu et al. |
| 2006/0177302 A1 | 8/2006 | Barry |
| 2006/0179818 A1 | 8/2006 | Merchant |
| 2006/0244327 A1 | 11/2006 | Kundel |
| 2007/0125066 A1 | 6/2007 | Orlando et al. |
| 2007/0262661 A1 | 11/2007 | Ai |
| 2008/0056888 A1 | 3/2008 | Somanath et al. |
| 2008/0098713 A1 | 5/2008 | Orlando et al. |
| 2008/0098718 A1 | 5/2008 | Henry et al. |
| 2008/0116010 A1 | 5/2008 | Portlock et al. |
| 2008/0148881 A1 | 6/2008 | Moniz et al. |
| 2008/0149445 A1 | 6/2008 | Kern et al. |
| 2008/0184694 A1 | 8/2008 | Guimbard et al. |
| 2008/0276621 A1 | 11/2008 | Somanath et al. |

(56) References Cited

U.S. PATENT DOCUMENTS

| | | |
|---|---|---|
| 2008/0304974 A1 | 12/2008 | Marshall et al. |
| 2009/0007569 A1 | 1/2009 | Lemmers, Jr. et al. |
| 2009/0053058 A1 | 2/2009 | Kohlenberg et al. |
| 2009/0056306 A1 | 3/2009 | Suciu et al. |
| 2009/0097967 A1 | 4/2009 | Smith et al. |
| 2009/0229242 A1 | 9/2009 | Schwark |
| 2009/0245997 A1 | 10/2009 | Hurwitz et al. |
| 2009/0293445 A1 | 12/2009 | Ress, Jr. |
| 2009/0314881 A1 | 12/2009 | Suciu et al. |
| 2009/0317229 A1 | 12/2009 | Suciu et al. |
| 2009/0320488 A1 | 12/2009 | Gilson et al. |
| 2010/0005810 A1 | 1/2010 | Jarrell et al. |
| 2010/0007207 A1 | 1/2010 | Peuser |
| 2010/0080700 A1 | 4/2010 | Venter |
| 2010/0105516 A1 | 4/2010 | Sheridan et al. |
| 2010/0126141 A1 | 5/2010 | Schilling |
| 2010/0127117 A1 | 5/2010 | Combes et al. |
| 2010/0132376 A1 | 6/2010 | Durocher et al. |
| 2010/0132377 A1 | 6/2010 | Durocher et al. |
| 2010/0154384 A1 | 6/2010 | Schilling |
| 2010/0219779 A1 | 9/2010 | Bradbrook |
| 2010/0236216 A1 | 9/2010 | Winter et al. |
| 2010/0296947 A1 | 11/2010 | Dibenedetto et al. |
| 2010/0301617 A1 | 12/2010 | Lundbladh |
| 2010/0317477 A1 | 12/2010 | Sheridan et al. |
| 2010/0326050 A1 | 12/2010 | Schilling et al. |
| 2011/0056208 A1 | 3/2011 | Norris et al. |
| 2011/0106510 A1 | 5/2011 | Poon |
| 2011/0116510 A1 | 5/2011 | Breslin et al. |
| 2011/0130246 A1 | 6/2011 | McCune et al. |
| 2011/0149624 A1 | 6/2011 | Yamanaka |
| 2012/0007431 A1 | 1/2012 | Jang et al. |
| 2012/0017603 A1 | 1/2012 | Bart et al. |
| 2013/0011547 A1 | 1/2013 | Castle |
| 2013/0115476 A1 | 5/2013 | Castle et al. |

OTHER PUBLICATIONS

Kandebo, Stanley, "GearedTurbofan Engine Design Targets Cost, Complexity," 1998, Aviation Week & Space Technology, vol. 148, Issue 8, start p. 32.

Mattingly, et al., Aircraft Engine Design, 2002, American Institute of Aeronautics and Astronautics, 2nd Edition, p. 292.

Article—"Gears Put a New Spin on Turbofan Performance," printed from Machine Design.com website.

Article—"Gas Power Cycle—Jet Propulsion Technology, a Case Study," from MachineDesign.com website.

Sessions, Ron, "Turbo Hydra-Matic 350 handbook", 1985, The Berkley Publishing Group, pp. 24-25.

Baskharone, Erian, "Principles of Turbomachinery in Air-Breathing Engines", 2006, Cambridge University Press, pp. 261-263.

Nagendra, S., "Optimal rapid multidisciplinary response networks: RAPIDDISK", 2005, Stuct Multidisk Optim 29, 213-231.

Guha, Optimum Fan Pressure Ratio for Bypass Engines with Separate or Mixed Exhaust Streams, 2001, Journal of Propulsion and Power, vol. 17 No. 5 Sep.-Oct.

Http://www.gereports.com/ges-breakthrough-genx-debuts-at-the-paris-air-show/ dated Jun. 15, 2009 and viewed Jan. 23, 2012.

http://www.geaviation.com/engines/commercial/genx/2b_fett.html viewed Jan. 28, 2012).

Hendricks et al, "Performance and Weight Estimates for an Advanced Open Rotor Engine" NASA/ TM-2012-217710, Sep. 2012, 20 pp.

Ciepluch et al., "Quiet, Powered-Lift Propulsion", NASA Conference Publication 2077, Nov. 14-15, 1978.

International Search Report and Written Opinion for International Application No. PCT/US13/41761 mailed on Mar. 21, 2014.

\* cited by examiner

FUNDAMENTAL GEAR SYSTEM ARCHITECTURE

CROSS-REFERENCE TO RELATED APPLICATION

This application is a continuation-in-part of U.S. application Ser. No. 13/557,614 filed Jul. 25, 2012 that in turn claims priority to Provisional Application No. 61/653,731 filed May 31, 2012.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section typically includes at least a fan drive turbine.

The fan drive turbine may drive a first compressor through an inner shaft to form a low spool. A speed reduction device such as an epicyclical gear assembly may be utilized to drive the fan section such that the fan section may rotate at a speed different than the fan drive turbine so as to increase the overall propulsive efficiency of the engine. The efficiency at which the gear assembly transfers power is a consideration in the development of a gear driven fan. Power or energy not transferred through the gearbox may result in the generation of heat that may be removed with a lubrication system. Typically, the more heat generated, the larger and heavier the lubrication system.

Although geared architectures can provide improved propulsive efficiency, other factors including heat removal and lubrication can detract from the improved propulsive efficiency. Accordingly, turbine engine manufacturers continue to seek further improvements to engine performance including improvements to thermal, transfer and propulsive efficiencies.

SUMMARY

A gas turbine engine, according to an exemplary embodiment of this disclosure, among other possible things includes a fan that includes a plurality of fan blades rotatable about an axis, a compressor section, a combustor that is in fluid communication with the compressor section, and a fan drive turbine that is in communication with the combustor. The fan drive turbine has a first exit area at a first exit point and is configured to rotate at a first speed. A second turbine section includes a second exit area at a second exit point and is configured to rotate at a second speed that is faster than the first speed. A first performance quantity is defined as a product of the first speed squared and the first area. A second performance quantity is defined as a product of the second speed squared and the second area. A ratio of the first performance quantity to the second performance quantity is between about 0.5 and about 1.5. A gear system is configured to provide a speed reduction between the fan drive turbine and the fan, and to transfer shaft power input from the fan drive turbine to the fan at efficiency greater than about 98% and less than 100%. A mount flexibly supports portions of the gear system. The mount extends from a static structure of the engine to accommodate at least radial movement between the gear system and the static structure. A lubrication system is configured to provide lubricant to the gear system and to remove thermal energy from the gear system.

In a further embodiment of the above, the lubrication system includes a capacity for removing an amount of energy that is greater than zero and less than about 2% of the energy input into the gear system during operation of the gas turbine engine.

In a further embodiment of any of the above, the fan delivers a portion of air into a bypass duct. A bypass ratio is defined as the portion of air delivered into the bypass duct divided by the amount of air delivered into the compressor section. The bypass ratio is greater than about 6.0.

In a further embodiment of any of the above, the mount includes a load limiter for limiting movement of the gear system responsive to an unbalanced condition.

In a further embodiment of any of the above, the bypass ratio is greater than about 10.0.

In a further embodiment of any of the above, the ratio is above or equal to about 0.8.

In a further embodiment of any of the above, a pressure ratio across the fan drive turbine is greater than about 5:1.

In a further embodiment of any of the above, a ratio of a sea level take-off flat-rated static thrust is provided by the gas turbine engine, to a combined volume of the fan drive turbine. The second turbine that is greater than or equal to about 1.5 lbf/inch$^3$ and less than or equal to about 5.5 lbf/inch$^3$.

A gas turbine engine, according to an exemplary embodiment of this disclosure, among other possible things includes a fan including a plurality of fan blades rotatable about an axis, a compressor section, a combustor that is in fluid communication with the compressor section, and a turbine section including a fan drive turbine and a second turbine that is in communication with the combustor. A ratio of sea level take-off flat-rated static thrust is provided by the gas turbine engine to a volume of the turbine section is greater than or equal to about 1.5 lbf/inch$^3$ and less than about 5.5 lbf/inch$^3$. A gear system is configured to provide a speed reduction between the fan drive turbine and the fan, and to transfer power input from the fan drive turbine to the fan at an efficiency greater than about 98% and less than 100%. A mount flexibly supports portions of the gear system. The mount extends from a static structure of the engine to accommodate at least radial movement between the gear system and the static structure. A lubrication system is configured to provide lubricant to the gear system and to remove thermal energy from the gear system.

In a further embodiment of the above, the lubrication system includes a capacity for removing an amount of energy that is greater than zero and less than about 2% of the energy input into the gear system during operation of the gas turbine engine.

In a further embodiment of any of the above, the mount includes a load limiter for limiting movement of the gear system responsive to an unbalanced condition.

In a further embodiment of any of the above, the fan delivers a portion of air into a bypass duct. A bypass ratio is defined as the portion of air delivered into the bypass duct divided by the amount of air delivered into the compressor section. The bypass ratio is greater than about 6.0.

In a further embodiment of any of the above, the ratio is greater than or equal to about 2.0 lbf/inch$^3$.

In a further embodiment of any of the above, the ratio is greater than or equal to about 4.0 lbf/inch$^3$.

A gas turbine engine, according to an exemplary embodiment of this disclosure, among other possible things includes a fan including a plurality of fan blades rotatable about an axis, a compressor section, a combustor that is in fluid communication with the compressor section, and a fan drive turbine that is in communication with the combustor. A gear system is configured to provide a speed reduction between the fan drive turbine and the fan, and to transfer power input from the fan drive turbine to the fan at an efficiency greater than about 98% and less than 100%. A mount flexibly supports portions of the gear system. The mount extends from a static structure of the engine to accommodate at least radial movement between the gear system and the static structure. A lubrication system is configured to provide lubricant to the gear system and to remove thermal energy from the gear system.

In a further embodiment of the above, the lubrication system includes a capacity for removing an amount of energy that is greater than zero and less than about 2% of energy input into the gear system during operation of the gas turbine engine.

In a further embodiment of any of the above, the fan delivers a portion of air into a bypass duct. A bypass ratio is defined as the portion of air delivered into the bypass duct divided by the amount of air delivered into the compressor section. The bypass ratio is greater than about 6.0.

In a further embodiment of any of the above, the mount includes a load limiter for limiting movement of the gear system responsive to an unbalanced condition.

In a further embodiment of any of the above, the bypass ratio is greater than about 10.0.

In a further embodiment of any of the above, a pressure ratio across the fan drive turbine is greater than about 5:1.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1A:
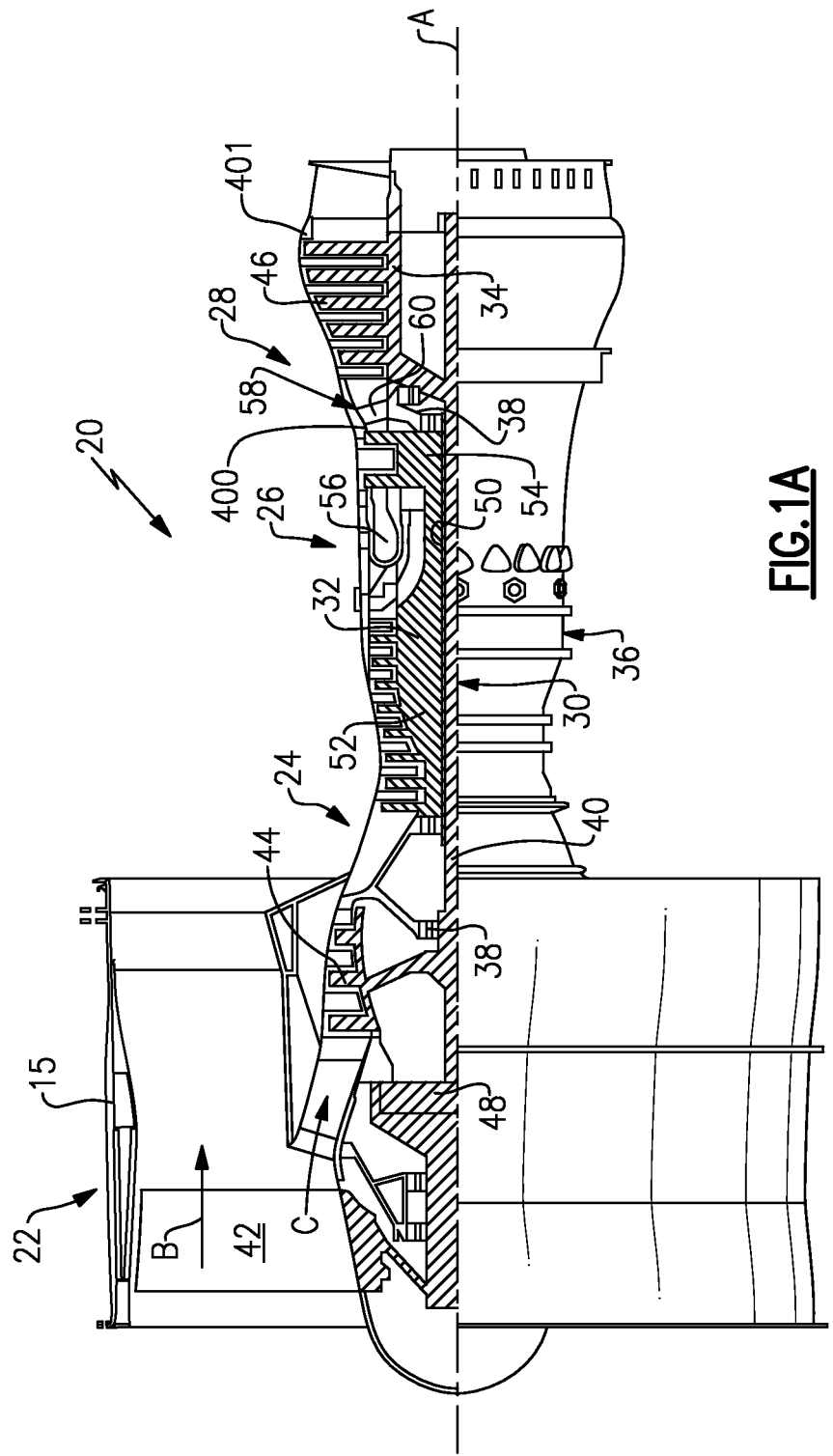
FIG. 1A is a schematic view of an example gas turbine engine.

FIG. 1A schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans and the teachings also may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core flow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a speed reduction ratio of greater than about 2.3. In some embodiments, the speed reduction ratio may be greater than about 2.6 and in other embodiments the speed reduction ratio may be greater than about 3.0.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7]^{0.5}$. The "Low corrected fan tip speed", as disclosed herein according to one non-limiting embodiment, is less than about 1150 ft/second.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion of the airflow passing therethrough.

The amount of thrust that can be produced by a particular turbine section compared to how compact the turbine section is, is referred to in this disclosure as the power density, or the force density, of the turbine section, and is derived by the flat-rated Sea Level Take-Off (SLTO) thrust divided by the volume of the entire turbine section. The example volume is determined from an inlet of the high pressure turbine 54 to an exit of the low pressure turbine 46. In order to increase the power density of the turbine section 28, each of the low pressure and high pressure turbines 46, 54 is made more compact. That is, the high pressure turbine 54 and the low pressure turbine 46 are made with a shorter axial length, and the spacing between each of the turbines 46, 54 is decreased, thereby decreasing the volume of the turbine section 28. The power density in the disclosed gas turbine engine 20 including the gear driven fan section 22 is greater than the power density provided in prior art gas turbine engine including a gear driven fan. Eight disclosed exemplary engines, which incorporate turbine sections and fan sections driven through a reduction gear system and architectures as set forth in this application, are described in Table I as follows:

TABLE 1

| Engine | Thrust SLTO (lbf) | Turbine section volume from the Inlet (in³) | Thrust/turbine section volume (lbf/in³) |
|---|---|---|---|
| 1 | 17,000 | 3,859 | 4.4 |
| 2 | 23,300 | 5,330 | 4.37 |
| 3 | 29,500 | 6,745 | 4.37 |
| 4 | 33,000 | 6,745 | 4.84 |
| 5 | 96,500 | 31,086 | 3.1 |
| 6 | 96,500 | 62,172 | 1.55 |
| 7 | 96,500 | 46,629 | 2.07 |
| 8 | 37,098 | 6,745 | 5.50 |

In some embodiments, the power density (also referred to as "thrust density") is greater than or equal to about 1.5 lbf/in³. In further embodiments, the power density is greater than or equal to about 2.0 lbf/in³. In further embodiments, the power density is greater than or equal to about 3.0 lbf/in³. In further embodiments, the power density is greater than or equal to about 4.0 lbf/in³. In further embodiments, the power density is less than or equal to about 5.5 lbf/in³.

Engines made with the disclosed gear driven fan architecture, and including turbine sections as set forth in this application, provide very high efficiency operation, and increased fuel efficiency.

Figure 1B:
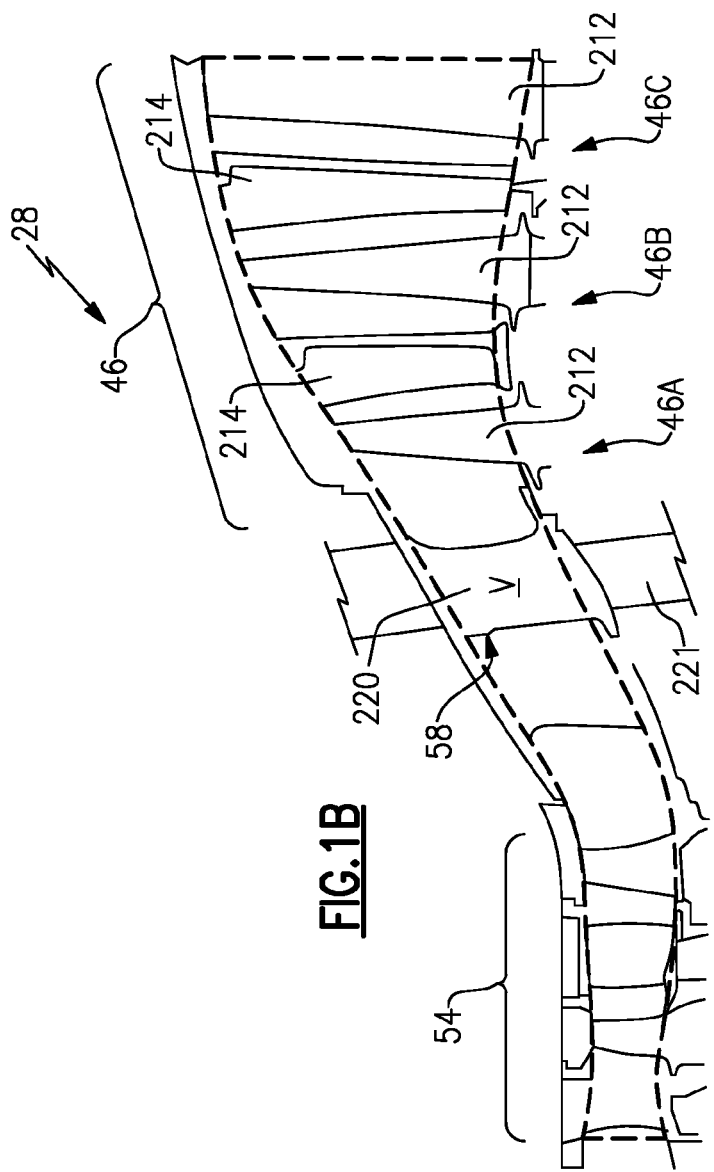
FIG. 1B is a schematic view of a feature of the example gas turbine engine.

Referring to FIG. 1B, the example turbine section 28 volume is schematically shown and includes first, second and third stages 46A, 46B and 46C. Each of the stages 46A, 46B and 46C includes a corresponding plurality of blades 212 and vanes 214. The example turbine section further includes at least one example air-turning vane 220 between the high and low turbines 54, 46 that has a modest camber to provide a small degree of redirection and achieve a desired flow angle relative to blades 212 of the first stage 46a of the low pressure turbine 46. The disclosed vane 220 could not efficiently perform the desired airflow function if the high and pressure turbines 54, 46 rotated in a common direction.

The example mid-turbine frame 58 includes multiple air turning vanes 220 arrayed circumferentially in a row that direct air flow exiting the high pressure turbine 54 and ensure that air is flowing in the proper direction and with the proper amount of swirl. Because the disclosed turbine section 28 is more compact than previously utilized turbine sections, air has less distance to travel between entering the mid-turbine frame 58 and entering the low pressure turbine 46. The smaller axial travel distance results in a decrease in the amount of swirl lost by the high-speed airflow during the transition from the mid-turbine frame 58 to the low pressure turbine 46, and allow the vanes 220 of the mid-turbine frame 58 to function as inlet guide vanes of the low pressure turbine 46. The mid-turbine frame 58 also includes a strut 221 providing structural support to both the mid-turbine frame 58 and to the engine housing. In one example, the mid-turbine frame 58 is much more compact by encasing the strut 221 within the vane 220, thereby decreasing the length of the mid-turbine frame 58.

At a given fan tip speed and thrust level provided by a given fan size, the inclusion of the speed change device 48 (shown in FIG. 1A) provides a gear reduction ratio, and thus the speed of the low pressure turbine 46 and low pressure compressor 44 components may be increased. More specifically, for a given fan diameter and fan tip speed, increases in gear ratios provide for a faster turning turbine that, in turn, provides for an increasingly compact turbine and increased thrust to volume ratios of the turbine section 28. By increasing the gear reduction ratio, the speed at which the low pressure compressor 44 and the low pressure turbine 46 turn, relative to the speed of the fan 42, is increased.

Increases in rotational speeds of the gas turbine engine 20 components increases overall efficiency, thereby providing for reductions in the diameter and the number of stages of the low pressure compressor 44 and the low pressure turbine 46 that would otherwise be required to maintain desired flow characteristics of the air flowing through the core flow path C. The axial length of each of the low pressure compressor 44 and the low pressure turbine 46 can therefore be further reduced due to efficiencies gained from increased speed provided by an increased gear ratio. Moreover, the reduction in the diameter and the stage count of the turbine section 28 increases the compactness and provides for an overall decrease in required axial length of the example gas turbine engine 20.

In order to further improve the thrust density of the gas turbine engine 20, the example turbine section 28 (including the high pressure turbine 54, the mid-turbine frame 58, and the low pressure turbine 46) is made more compact than traditional turbine engine designs, thereby decreasing the length of the turbine section 28 and the overall length of the gas turbine engine 20.

In order to make the example low pressure turbine 46 compact, make the diameter of the low pressure turbine 46 more compatible with the high pressure turbine 54, and thereby make the air-turning vane 220 of the mid-turbine frame 58 practical, stronger materials in the initial stages of the low pressure turbine 46 may be required. The speeds and centrifugal pull generated at the compact diameter of the low pressure turbine 46 pose a challenge to materials used in prior art low pressure turbines.

Examples of materials and processes within the contemplation of this disclosure for the air-turning vane 220, the low pressure turbine blades 212, and the vanes 214 include materials with directionally solidified grains to provided added strength in a span-wise direction. An example method for creating a vane 220, 214 or turbine blade 212 having directionally solidified grains can be found in U.S. application Ser. No. 13/290,667, and U.S. Pat. Nos. 7,338,259 and 7,871,247, each of which is incorporated by reference. A further, engine embodiment utilizes a cast, hollow blade 212 or vane 214 with cooling air introduced at the leading edge of the blade/vane and a trailing edge discharge of the cooling air. Another embodiment uses an internally cooled blade 212 or vane 214 with film cooling holes. An additional engine embodiment utilizes an aluminum lithium material for construction of a portion of the low pressure turbine 46. The example low pressure turbine 46 may also be constructed utilizing a powdered metal disc or rotor.

Additionally, one or more rows of turbine blades 212 of the low pressure turbine 46 can be constructed using a single crystal blade material. Single crystal constructions oxidize at higher temperatures as compared to non-single crystal constructions and thus can withstand higher temperature airflow. Higher temperature capability of the turbine blades 212 provide for a more efficient low pressure turbine 46 that may be further reduced in size.

While the illustrated low pressure turbine 46 includes three turbine stages 46a, 46b, and 46c, the low pressure turbine 46 can be modified to include up to six turbine stages. Increasing the number of low pressure turbine stages 46a, 46b, 46c at constant thrust slightly reduces the thrust density of the turbine section 28 but also increases power available to drive the low pressure compressor and the fan section 22.

Further, the example turbine blades may be internally cooled to allow the material to retain a desired strength at higher temperatures and thereby perform as desired in view of the increased centrifugal force generated by the compact configuration while also withstanding the higher temperatures created by adding low pressure compressor 44 stages and increasing fan tip diameter.

Each of the disclosed embodiments enables the low pressure turbine 46 to be more compact and efficient, while also improving radial alignment to the high pressure turbine 54. Improved radial alignment between the low and high pressure turbines 46, 54, increases efficiencies that can offset any increases in manufacturing costs incurred by including the air turning vane 220 of the mid-turbine frame 58.

In light of the foregoing embodiments, the overall size of the turbine section 28 has been greatly reduced, thereby enhancing the engine's power density. Further, as a result of the improvement in power density, the engine's overall propulsive efficiency has been improved.

Figure 1C:
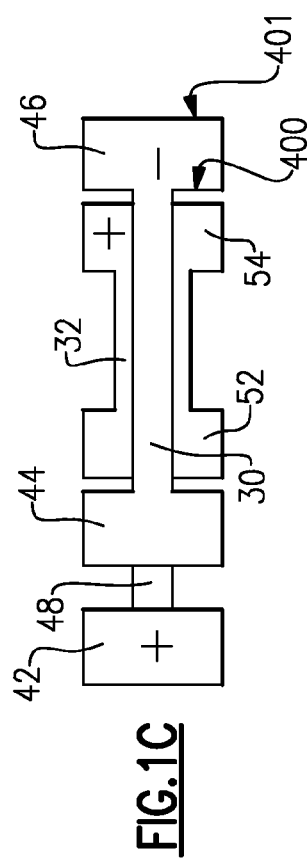
FIG. 1C is a schematic view of another feature of the example gas turbine engine.

An exit area 400 is shown, in FIG. 1C and FIG. 1A, at the exit location for the high pressure turbine section 54. An exit area for the low pressure turbine section is defined at exit 401 for the low pressure turbine section. As shown in FIG. 1C, the turbine engine 20 may be counter-rotating. This means that the low pressure turbine section 46 and low pressure compressor section 44 rotate in one direction, while the high pressure spool 32, including high pressure turbine section 54 and high pressure compressor section 52 rotate in an opposed direction. The gear reduction 48, which may be, for example, an epicyclic transmission (e.g., with a sun, ring, and star gears), is selected such that the fan 42 rotates in the same direction as the high spool 32. With this arrangement, and with the other structure as set forth above, including the various quantities and operational ranges, a very high speed can be provided to the low pressure spool. Low pressure turbine section and high pressure turbine section operation are often evaluated looking at a performance quantity which is the exit area for the turbine section multiplied by its respective speed squared. This performance quantity ("PQ") is defined as:

$$PQ_{lpt} = (A_{lpt} \times V_{lpt}^2) \qquad \text{Equation 1}$$

$$PQ_{hpt} = (A_{hpt} \times V_{hpt}^2) \qquad \text{Equation 2}$$

where $A_{lpt}$ is the area of the low pressure turbine section at the exit thereof (e.g., at 401), where $V_{lpt}$ is the speed of the low pressure turbine section, where $A_{hpt}$ is the area of the high pressure turbine section at the exit thereof (e.g., at 400), and where $V_{hpt}$ is the speed of the high pressure turbine section.

Thus, a ratio of the performance quantity for the low pressure turbine section compared to the performance quantify for the high pressure turbine section is:

$$(A_{lpt} \times V_{lpt}^2)/(A_{hpt} \times V_{hpt}^2) = PQ_{lpt}/PQ_{hpt} \qquad \text{Equation 3}$$

In one turbine embodiment made according to the above design, the areas of the low and high pressure turbine sections are 557.9 in² and 90.67 in², respectively. Further, the speeds of the low and high pressure turbine sections are 10179 rpm and 24346 rpm, respectively. Thus, using Equations 1 and 2 above, the performance quantities for the low and high pressure turbine sections are:

$$PQ_{lpt} = (A_{lpt} \times V_{lpt}^2) = (557.9 \text{ in}^2)(10179 \text{ rpm})^2 = 57805157673.9 \text{ in}^2 \text{ rpm}^2 \qquad \text{Equation 1}$$

$$PQ_{hpt} = (A_{hpt} \times V_{hpt}^2) = (90.67 \text{ in}^2)(24346 \text{ rpm})^2 = 53742622009.72 \text{ in}^2 \text{ rpm}^2 \qquad \text{Equation 2}$$

and using Equation 3 above, the ratio for the low pressure turbine section to the high pressure turbine section is:

Ratio=$PQ_{lpt}/PQ_{hpt}$=57805157673.9 in² rpm²/
53742622009.72 in² rpm²=1.075

In another embodiment, the ratio was about 0.5 and in another embodiment the ratio was about 1.5. With $PQ_{lpt}/PQ_{hpt}$ ratios in the 0.5 to 1.5 range, a very efficient overall gas turbine engine is achieved. More narrowly, $PQ_{lpt}/PQ_{hpt}$ ratios of above or equal to about 0.8 are more efficient. Even more narrowly, $PQ_{lpt}/PQ_{hpt}$ ratios above or equal to 1.0 are even more efficient. As a result of these $PQ_{lpt}/PQ_{hpt}$ ratios, in particular, the turbine section can be made much smaller than in the prior art, both in diameter and axial length. In addition, the efficiency of the overall engine is greatly increased.

The low pressure compressor section of the example gas turbine engine 20 is improved with this arrangement and resembles a high pressure compressor section as it is more efficient and can do more compression work in fewer stages. The low pressure compressor section may be made smaller in radius and shorter in length while contributing more toward achieving the overall compression pressure ratio design target of the engine.

As appreciated, improvements to the low pressure turbine 46 that increase rotational speed and torque result in an increased load on the geared architecture 48. The increased loads on the geared architecture 48 include increases in lubricant requirements. Moreover, the increased speed and torques provided by the low pressure turbine 46 may only be fully realized if that power can be efficiently transferred through the geared architecture 48 and not lost as heat. Accordingly, the transfer efficiency of the geared architecture 48 and the capability of a corresponding lubricant system provide for the realization of the efficiencies gained from the improved turbine configuration.

Referring to FIG. 1a, the example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
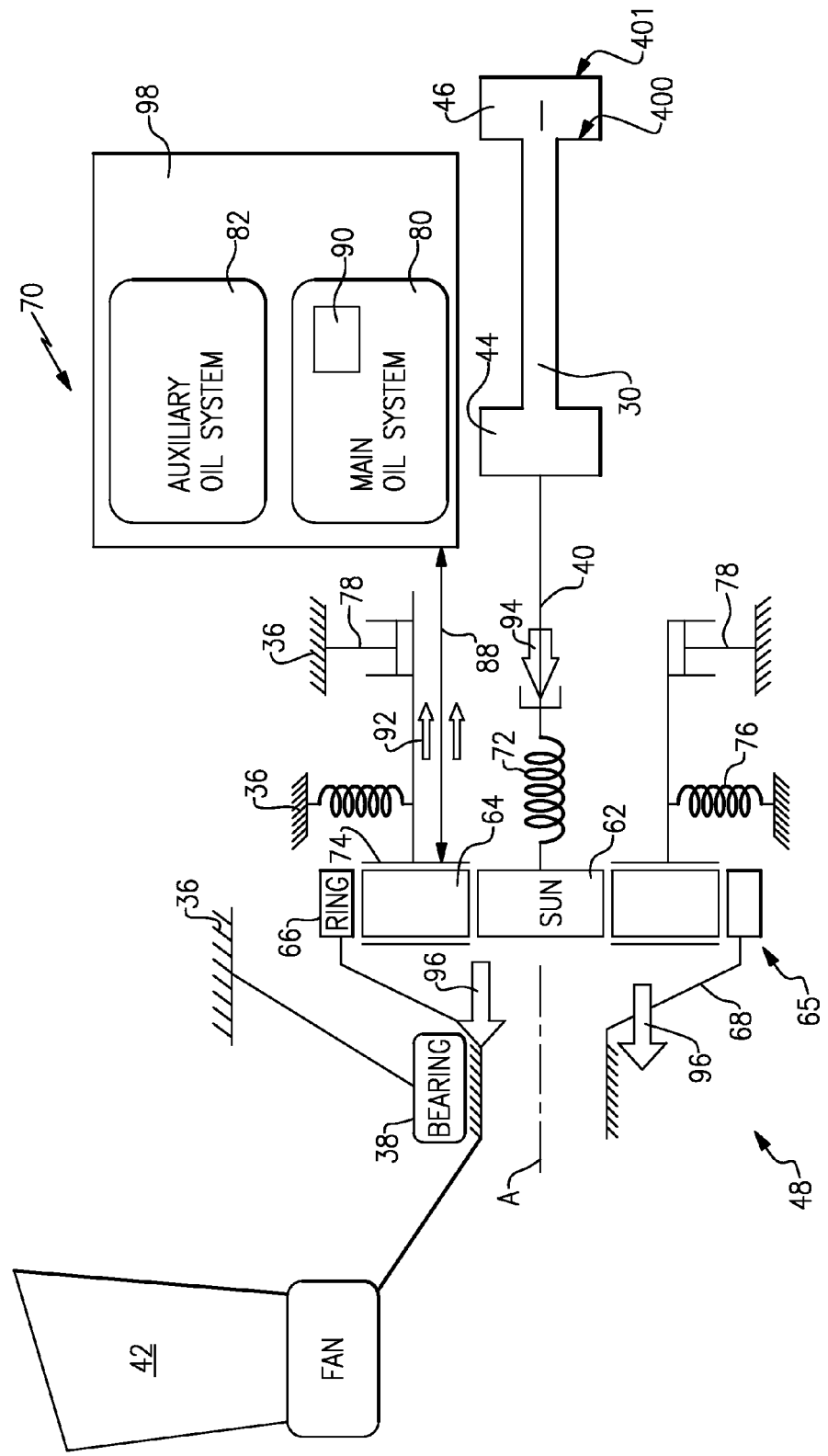
FIG. 2 is a schematic view of an example fan drive gear system including star epicyclical geared architecture.

Referring to FIG. 2 with continued reference to FIG. 1A, the example gas turbine engine includes a lubrication system 98. The lubrication system 98 provides lubricant flow to the rotating components of the gas turbine engine including the bearing assemblies 38 and the geared architecture 48. The lubrication system 98 further provides for the removal of heat generated in the various bearing systems and the geared architecture 48.

The example lubrication system 98 includes a main system 80 that provides lubrication during normal operating conditions of the gas turbine engine. An auxiliary system 82 is also included to supplement operation of the main lubrication system 80. The size and weight of the lubrication system 90 is directly related to its capacity for removing heat from the geared architecture 48. The greater the need for removal of heat, the larger and heavier the lubrication system 98 becomes. The amount of heat generated by the geared architecture 48 is therefore an important consideration in the configuration of a fan drive gear system.

The example geared architecture 48 is part of a fan drive gear system 70. The example geared architecture 48 comprises a gear assembly 65 that includes a sun gear 62 driven by a fan drive turbine 46. In this example, the fan drive turbine is the low pressure turbine 46. The sun gear 62 in turn drives intermediate gears 64 mounted on a carrier 74 by journal bearings. The carrier 74 is grounded to the static engine structure 36 and therefore the intermediate gears 64 do not orbit about the sun gear 62. The intermediate gears 64 intermesh and drive a ring gear 66 coupled to a fan shaft 68 to drive the fan 42.

The gear assembly 65 is flexibly mounted such that it may be isolated from vibrational and transient movement that could disturb alignment between the gears 62, 64 and 66. In this example, flexible mounts 76 support the carrier 74 and accommodate relative movement between the gear assembly 65 and the static structure 36. The example flexible mount 76 includes a spring rate that accommodates deflections that occur during normal operation of the fan drive gear system 70.

Power input through the inner shaft 40 of the fan drive turbine 46 is transmitted through a flexible coupling 72. The flexible coupling 72 also includes a spring rate that allows a defined amount of deflection and misalignment such that components of the gear assembly 65 are not driven out of alignment.

Although some relative movement is compensated by the flexible coupling 72 and the flexible mounts 76, movement beyond a desired limitation can detrimentally affect meshing engagement between the gears and therefore a load limiting device 78 is provided as part of the gear box mounting structure. The load limiter 78 constrains movement of the gear box 65. The limiter 78 further provides a stop that reacts to unbalanced loads on the gear box 65. Accordingly, the limiter prevents radial unbalanced loads and/or torsional overloads from damaging the gas turbine engine 20.

The example fan drive gear system 70 is sustained by a lubrication system 98. The lubrication system 98 provides for lubrication and cooling of the gears 62, 64 and 66 along with bearings supporting rotation of the gears. It is desirable to circulate lubricant as quickly as possible to maintain a desired temperature. Power transmission efficiency through the gear box 65 is detrimentally affected by elevated temperatures.

In this example, the lubricant system 98 includes a main system 80 that provides the desired lubricant flow through a plurality of conduits schematically illustrated by the line 88 to and from the gear box 65. The main oil system 80 also transmits heat, schematically by arrows 92, away from the gear box 65 to maintain a desired temperature.

The lubrication system 98 also includes the auxiliary oil system 82 that supplies oil flow to the gear box 65 in response to a temporary interruption in lubricant flow from the main oil system 80.

The efficiency of the example gear box 65 and overall geared architecture 48 is a function of the power input, schematically indicated by arrow 94, through the shaft 40 relative to power output, schematically indicated by arrows 96, to the fan shaft 68. Power input 94 compared to the amount of power output 96 is a measure of gear box efficiency. The example gear box 65 operates at an efficiency of greater than about 98%. In another disclosed example the example gear box 65 operates at efficiency greater than about 99%.

The disclosed efficiency is a measure of the amount of power 94 that is specifically transferred to the fan shaft 68 to rotate the fan 42. Power that is not transmitted through the gear box 65 is lost as heat and reduces the overall efficiency of the fan drive gear system 70. Any deficit between the input power 94 and output power 96 results in the generation of heat. Accordingly, in this example, the deficit of between about 1-2% between the input power 94 and output power 96 generates heat. In other words, between about 1% and 2% of the input power 94 is converted to heat energy that must be accommodated by the lubrication system 98 to maintain a working lubricant temperature within operational limits.

The example lubricant system 98 provides for the removal of thermal energy equal to or less than about 2% of the input power 94 from the low speed spool 30 that includes the fan drive turbine 46. In another non-limiting embodiment of the example fan drive gear system 70, the efficiency of the gear box 65 is greater than about 99% such that only about 1% of power input from the low speed spool 30 is transferred into heat energy that must be handled by the lubricant system 98. In another non-limiting embodiment of the example fan drive gear system 70 is an example turbine engine including three-spool architecture in which three spools concentrically rotate about a common axis and where a low spool enables a low pressure turbine 46 to drive a fan via a gearbox 65.

The larger the capacity for handling and removing thermal energy, the larger and heavier the lubricant system 98. In this example, the main oil system includes a heat exchanger 90 that accommodates heat 92 that is generated within the gear box 65. The heat exchanger 90 is an example of one element of the lubrication system 98 that is scaled to the desired capacity for removing thermal energy. As appreciated, other elements, such as for example lubricant pumps, conduit size along with overall lubricant quantity within the lubrication system 98 would also be increased in size and weight to provide increased cooling capacity. Accordingly, it is desirable to increase power transfer efficiency to reduce required overall heat transfer capacity of lubrication system 98.

In this example, the high efficiency of the example gear box 65 enables a relatively small and light lubricant system 98. The example lubricant system 98 includes features that can accommodate thermal energy generated by up to about 2% of the input power 94. In other words, the lubrication system 98 has an overall maximum capacity for removing thermal energy up to about 2% of the input power provided by the low pressure turbine 46.

Figure 3:
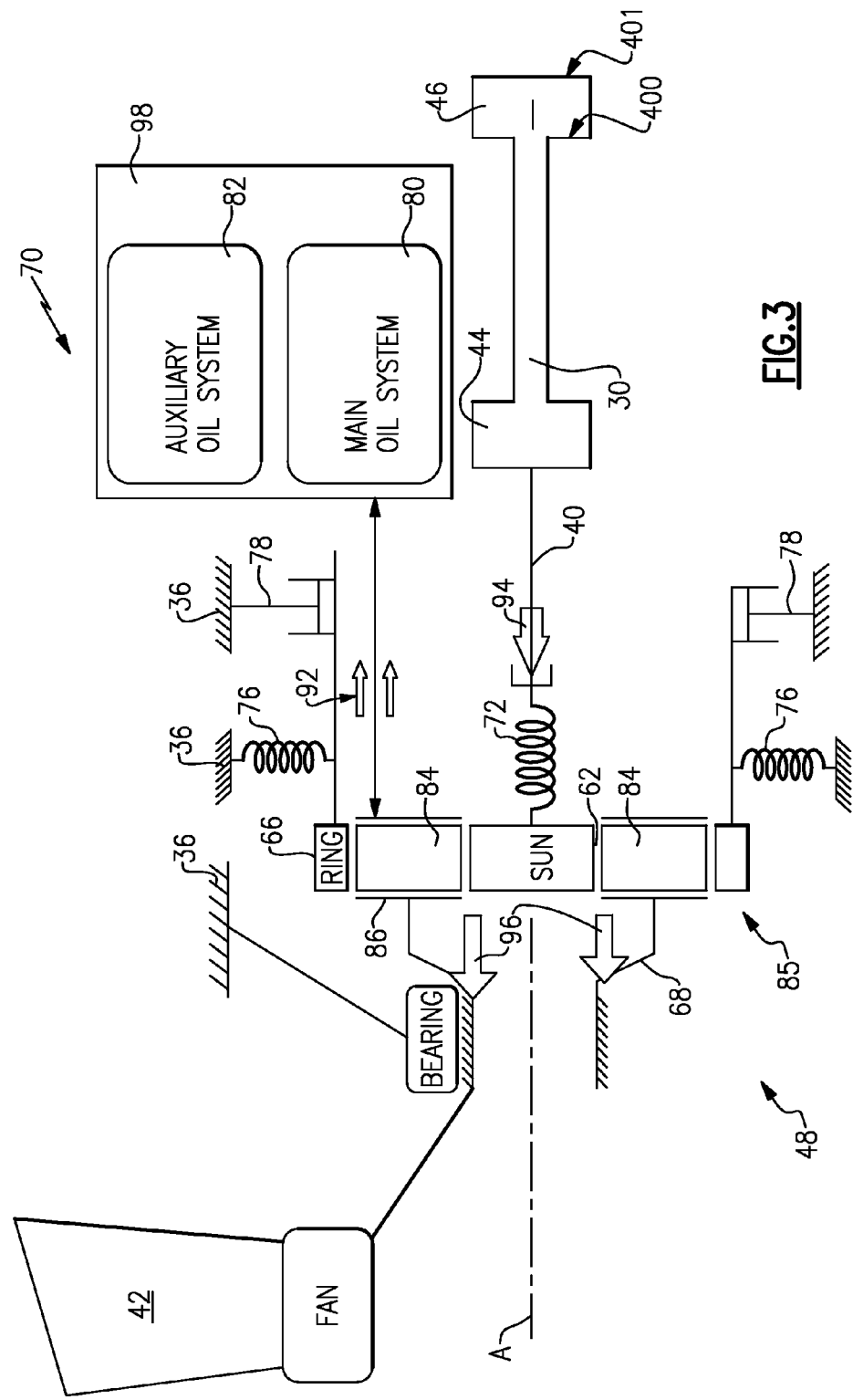
FIG. 3 is a schematic view of an example fan drive gear system including planetary epicyclical geared architecture.

Referring to FIG. 3 with continued reference to FIG. 1A, another example epicyclical gear box 85 is disclosed and comprises a planetary configuration. In a planetary configuration, planet gears 84 are supported on a carrier 86 that is rotatable about the engine axis A. The sun gear 62 remains driven by the inner shaft 40 and the low pressure turbine 46. The ring gear 66 is mounted to a fixed structure 36 such that it does not rotate about the axis. Accordingly, rotation of the sun gear 62 drives the planet gears 84 within the ring gear 66. The planet gears 84 are supported on the rotatable carrier 86 that in turn drives the fan shaft 68. In this configuration, the fan shaft 68 and the sun gear 62 rotate in a common direction, while the planet gears 84 individually rotate in a direction opposite to the sun gear 62 but collectively rotate about the sun gear 62 in the same direction as the rotation of the sun gear 62.

The example planetary gear box illustrated in FIG. 3 includes the ring gear 66 that is supported by flexible mount 76. The flexible mount 76 allows some movement of the gearbox 85 to maintain a desired alignment between meshing teeth of the gears 62, 84, 66. The limiter 78 prevents movement of the planetary gear box 85 beyond desired limits to prevent potential damage caused by radial imbalances and/or torsional loads.

The example low pressure turbine 46 inputs power 94 to drive the gear box 85. As in the previous example, the example gear box 85 transmits more than about 98% of the input power 94 to the fan drive shaft 68 as output power 96. In another example, the gear box 85 transmits more than about 99% of the input power 94 to the fan drive shaft 68 as output power 96.

The difference between the input power 94 and the output power 96 is converted into heat energy that is removed by the lubrication system 98. In this example, the lubrication system 98 has a capacity of removing no more heat 92 than is generated by about 2% of the input power 94 from the low speed spool 30 that includes the low pressure turbine 46. In another example. The lubrication system 98 has a capacity of removing no more heat 92 than is generated by about 1% of the input power 94. Accordingly, the efficiency provided by the example gear box 85 enables the lubrication system 98 to be of size that does not detract from the propulsive efficiency realized by turning the fan section 22 and low pressure turbine 46 at separate and nearer optimal speeds.

Accordingly the example fan drive gear system provides for the improvement and realization of propulsive efficiencies by limiting losses in the form of thermal energy, thereby enabling utilization of a lower capacity and sized lubrication system.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
   a fan including a plurality of fan blades rotatable about an axis;
   a compressor section;
   a combustor in fluid communication with the compressor section;
   a fan drive turbine in communication with the combustor, wherein the fan drive turbine has a first exit area at a first exit point and is configured to rotate at a first speed;
   a second turbine section including a second exit area at a second exit point and being configured to rotate at a second speed that is faster than the first speed, wherein a first performance quantity is defined as a product of the first speed squared and the first area, a second performance quantity is defined as a product of the second speed squared and the second area; and a ratio of the first performance quantity to the second performance quantity is between about 0.5 and about 1.5;
   a gear system configured to provide a speed reduction between the fan drive turbine and the fan, and to transfer shaft power input from the fan drive turbine to the fan at an efficiency greater than about 98% and less than 100%;
   a mount flexibly supporting portions of the gear system, the mount extending from a static structure of the engine to accommodate at least radial movement between the gear system and the static structure; and
   a lubrication system configured to provide lubricant to the gear system and to remove thermal energy from the gear system.

2. The gas turbine engine as recited in claim 1, wherein the lubrication system includes a capacity for removing an amount of energy that is greater than zero and less than about 2% of the energy input into the gear system during operation of the gas turbine engine.

3. The gas turbine engine as recited in claim 1, wherein said fan delivers a portion of air into a bypass duct, and a bypass ratio being defined as the portion of air delivered into the bypass duct divided by the amount of air delivered into the compressor section, with the bypass ratio being greater than about 6.0.

4. The gas turbine engine as recited in claim 1, wherein the mount includes a load limiter for limiting movement of the gear system responsive to an unbalanced condition.

5. The gas turbine engine as recited in claim 3, wherein the bypass ratio is greater than about 10.0.

6. The gas turbine engine as recited in claim 1, wherein the ratio is above or equal to about 0.8.

7. The gas turbine engine as recited in claim 1, wherein a pressure ratio across the fan drive turbine is greater than about 5:1.

8. The gas turbine engine as recited in claim 1, including a ratio of a sea level take-off flat-rated static thrust provided by the gas turbine engine, to a combined volume of the fan drive turbine and the second turbine that is greater than or equal to about 1.5 lbf/inch$^3$ and less than or equal to about 5.5 lbf/inch$^3$.

9. A gas turbine engine comprising:
a fan including a plurality of fan blades rotatable about an axis;
a compressor section;
a combustor in fluid communication with the compressor section;
a turbine section including a fan drive turbine and a second turbine in communication with the combustor, wherein a ratio of sea level take-off flat-rated static thrust provided by the gas turbine engine to a volume of the turbine section is greater than or equal to about 1.5 lbf/inch$^3$ and less than about 5.5 lbf/inch$^3$;
a gear system configured to provide a speed reduction between the fan drive turbine and the fan, and to transfer power input from the fan drive turbine to the fan at an efficiency greater than about 98% and less than 100%;
a mount flexibly supporting portions of the gear system, the mount extending from a static structure of the engine to accommodate at least radial movement between the gear system and the static structure; and
a lubrication system configured to provide lubricant to the gear system and to remove thermal energy from the gear system.

10. The gas turbine engine as recited in claim 9, wherein the lubrication system includes a capacity for removing an amount of energy that is greater than zero and less than about 2% of the energy input into the gear system during operation of the gas turbine engine.

11. The gas turbine engine as recited in claim 9, wherein the mount includes a load limiter for limiting movement of the gear system responsive to an unbalanced condition.

12. The gas turbine engine as recited in claim 9, wherein said fan delivers a portion of air into a bypass duct, and a bypass ratio being defined as the portion of air delivered into the bypass duct divided by the amount of air delivered into the compressor section, with the bypass ratio being greater than about 6.0.

13. The gas turbine engine as recited in claim 9, wherein the ratio is greater than or equal to about 2.0 lbf/inch$^3$.

14. The gas turbine engine as recited in claim 9, wherein the ratio is greater than or equal to about 4.0 lbf/inch$^3$.

15. A gas turbine engine comprising:
a fan including a plurality of fan blades rotatable about an axis;
a compressor section;
a combustor in fluid communication with the compressor section;
a fan drive turbine in communication with the combustor;
a gear system configured to provide a speed reduction between the fan drive turbine and the fan, and to transfer power input from the fan drive turbine to the fan at an efficiency greater than about 98% and less than 100%;
a mount flexibly supporting portions of the gear system, the mount extending from a static structure of the engine to accommodate at least radial movement between the gear system and the static structure; and
a lubrication system configured to provide lubricant to the gear system and to remove thermal energy from the gear system.

16. The gas turbine engine as recited in claim 15, wherein the lubrication system includes a capacity for removing an amount of energy that is greater than zero and less than about 2% of energy input into the gear system during operation of the gas turbine engine.

17. The gas turbine engine as recited in claim 15, wherein said fan delivers a portion of air into a bypass duct, and a bypass ratio being defined as the portion of air delivered into the bypass duct divided by the amount of air delivered into the compressor section, with the bypass ratio being greater than about 6.0.

18. The gas turbine engine as recited in claim 15, wherein the mount includes a load limiter for limiting movement of the gear system responsive to an unbalanced condition.

19. The gas turbine engine as recited in claim 17, wherein the bypass ratio is greater than about 10.0.

20. The gas turbine engine as recited in claim 15, wherein a pressure ratio across the fan drive turbine is greater than about 5:1.

* * * * *